(12) United States Patent
Livingston et al.

(10) Patent No.: US 9,948,766 B2
(45) Date of Patent: Apr. 17, 2018

(54) ANTI-DISTRACTED DRIVER SYSTEM

(71) Applicant: LIVINGSTON ENTERPRISES LLC, Jupiter, FL (US)

(72) Inventors: Antony Livingston, Jupiter, FL (US); Christopher M. Macheca, Centennial, CO (US)

(73) Assignee: Livingston Enterprises LLC, Jupiter, FL (US)

( * ) Notice: Subject to any disclaimer, the term of this patent is extended or adjusted under 35 U.S.C. 154(b) by 0 days.

(21) Appl. No.: 15/677,866

(22) Filed: Aug. 15, 2017

(65) Prior Publication Data
US 2017/0346942 A1    Nov. 30, 2017

Related U.S. Application Data

(63) Continuation of application No. 15/044,388, filed on Feb. 16, 2016, now Pat. No. 9,769,308.

(51) Int. Cl.
H04M 1/725        (2006.01)
H04W 4/00         (2018.01)
G08C 17/02        (2006.01)

(52) U.S. Cl.
CPC ........ *H04M 1/72577* (2013.01); *G08C 17/02* (2013.01); *H04W 4/008* (2013.01)

(58) Field of Classification Search
CPC .............. H04W 4/008; H04M 1/7253; H04M 2250/02; G07C 9/00309; G07C 2009/00547; G08C 2201/93; G08C 17/02; B60R 25/257; B60R 25/04; H04L 63/08
See application file for complete search history.

(56) References Cited

U.S. PATENT DOCUMENTS

| | | | |
|---|---|---|---|
| 5,704,008 A * | 12/1997 | Duvall, Jr. | .............. B60R 25/04 704/273 |
| 9,252,951 B1 * | 2/2016 | Katzer | ............... G07C 9/00309 |
| 9,454,413 B1 | 9/2016 | Smith et al. | |
| 2013/0157640 A1 | 6/2013 | Aycock | |
| 2013/0247148 A1 | 9/2013 | Nappier et al. | |
| 2014/0274013 A1 | 9/2014 | Santavicca | |
| 2016/0133072 A1 | 5/2016 | Santavicca | |

* cited by examiner

Primary Examiner — Nizar Sivji
(74) Attorney, Agent, or Firm — Blank Rome LLP

(57) ABSTRACT

A system to control turning on an engine of a vehicle includes a relay and a detect circuit. The detect circuit is configured to detect a client device and, upon detection of a client device, to assert a signal indicating that a client device has been detected. Responsive to detection of the client device, the detect circuit generates a signal to cause the relay to close upon activation of a starter control in the vehicle to thereby cause current to flow to a starter motor in the vehicle.

10 Claims, 4 Drawing Sheets

ANTI-DISTRACTED DRIVER SYSTEM

RELATED APPLICATION

This application claims priority to, and incorporates by reference, U.S. application Ser. No. 15/044,388 filed Feb. 16, 2016.

BACKGROUND

The proliferation of smart phones with cellular phone, text, messaging, and email services has created a "distracted driver" problem for drivers of vehicles. Some states have banned the use of cell phones while driving, but other states have not. Without regard to the legality of using a cell phone while driving a vehicle, the use of the phone to text, check emails, etc. while driving remains widespread.

BRIEF DESCRIPTION OF THE DRAWINGS

For a detailed description of exemplary embodiments of the invention, reference will now be made to the accompanying drawings in which.

DETAILED DESCRIPTION

Figure 1:
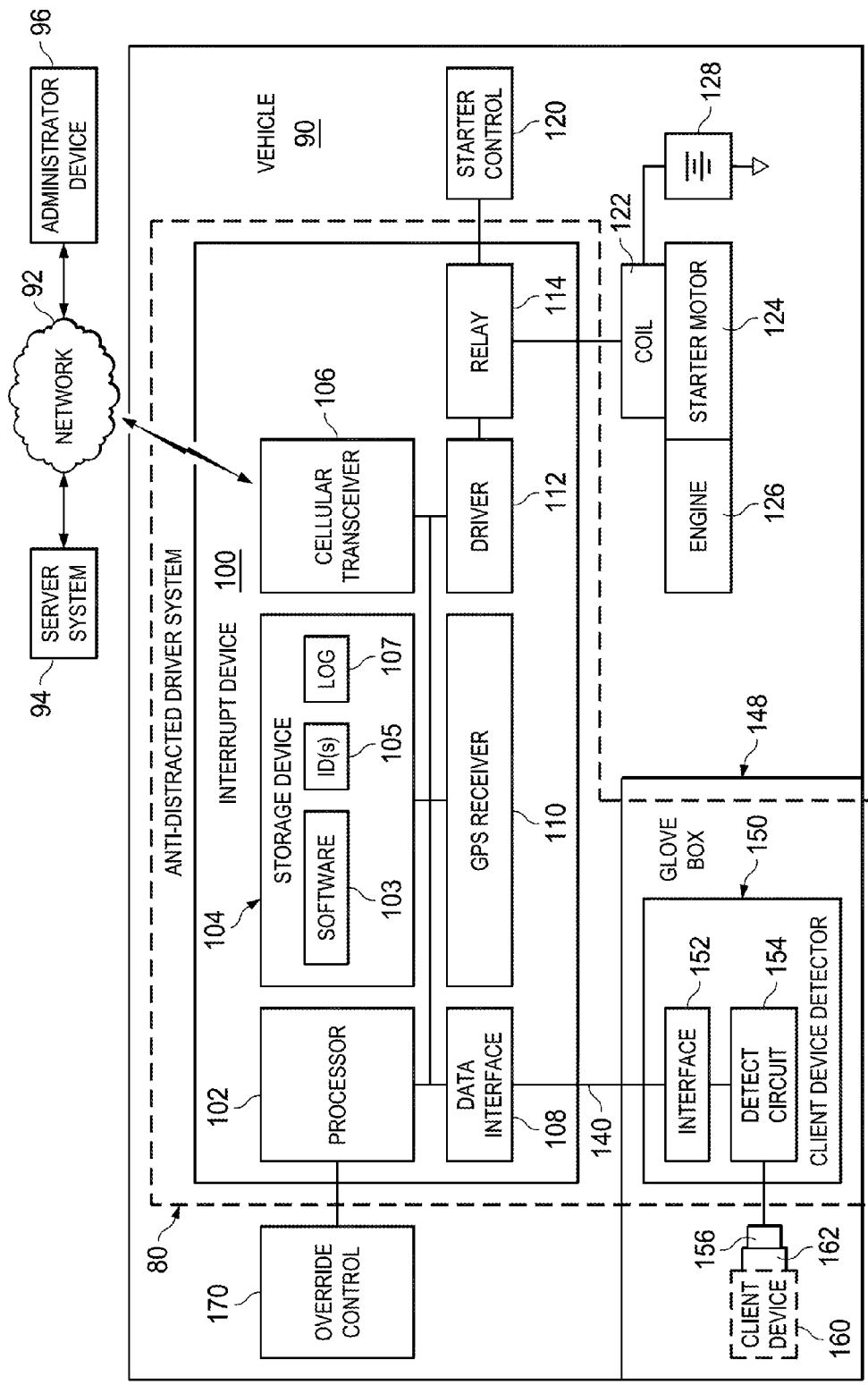
FIG. 1 shows an anti-distracted driver system including an interrupt device and a client device detector in accordance with at least some examples.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct connection or through an indirect connection via other devices and connections.

The various disclosed embodiments are directed to an anti-distracted driver system that avoids or at least reduces the potential for a driver of a vehicle to be distracted by the use of a smart phone while driving. The embodiments described herein target the distraction that smart phones may cause, but in general target the distraction that any type of client device may cause. A client device is a device that a driver of a vehicle might be tempted to use while driving a vehicle. Examples of client devices include smart phones, tablet devices, etc. Client devices may provide such services as any one or more of phone calls, messaging services such as texting, emails, internet browsers, applications (apps), etc.

In accordance with various embodiments, the system includes a client device detector and an interrupt device. The client device detector detects whether a client device is in close proximity to the detector. In some implementations, the client device detector may be located in the glove box of the vehicle. The client device detector may include a cradle into which the vehicle driver inserts his or her client device, or an electrical cable to which the client device is attached, or a short distance wireless interface. The interrupt device may include a relay connected between the starter control (e.g., ignition switch) and the starter solenoid of the vehicle's starter motor. The relay may be engaged to permit current to flow from the starter control to the starter solenoid of the starter motor to allow the vehicle's engine to be started, or to be disengaged to preclude current from flowing to the starter motor's solenoid to preclude the engine from starting. Engaging the relay refers to asserting an electrical signal to the relay to cause a pair of electrical contacts to connect together thereby enabling a current path through the relay. Disengaging the relay refers to asserting a different electrical signal to cause the contacts to open thereby breaking the current path through the relay.

Each client device includes a unique identifier such as a serial number, or International Mobile Equipment Identity (IMEI), Integrated Circuit Card Identifier (ICCI), Mobile Equipment Identifier (MEID) for cellular, or an internet protocol (IP) address, media access control (MAC) address, Wi-Fi address, Bluetooth address for non-cellular which is associated with the device serial number. Through a computer, smart phone or other type of internet-connected device, an administrator can log in to an account and provide the unique identifier of one or more client devices to a server. The unique identifiers provided by the account administrator are associated with client devices that the administrator has authorized to be used to start a particular vehicle (also identified by the administrator). The anti-distracted driver system includes a cellular transceiver and the server downloads the unique identifiers to the anti-distracted driver system installed in the vehicle thereby programming the system as to which client devices must be detected and authenticated to enable the vehicle's engine to be started.

In some embodiments, the relay of the interrupt device is disengaged by default thereby preventing the vehicle form being started even if someone attempts to activate the ignition (e.g., turn the key in the ignition switch, push a start button, etc.). The client device detector of the anti-distracted driver system detects whether a client device is present. If no client device is detected, the interrupt device will disengage the relay (or for a relay that is already disengaged, not engage the relay) thereby preventing the vehicle from being started. If the client device detector detects the presence of a client device, the client device detector may read the unique identifier from the client device. The client device detector or the interrupt device then compares the client device's identifier to the valid identifiers previously downloaded to the anti-distracted driver system. If a client device is detected but the unique identifier of the client device does not match the previously downloaded valid identifiers, the interrupt device will disengage the relay (or for a relay that is already disengaged, not engage the relay) thereby preventing the vehicle from being started.

In short, in some embodiments, the only way the vehicle can be started is for a client device (presumably owned by the driver) to be detected by the client device detector and for the detected client device to be authenticated. Because the device detection and authentication can only occur if the client device is coupled to the client device detector which may be in the glove box, the only way to start the vehicle is for the client device to be placed in the glove box. As the client device is in the glove box, the driver cannot readily use the client device and thus cannot be distracted by the client device. In some embodiments, the interrupt device prevents an electric vehicle from having its motor operate to move the vehicle.

FIG. 1 illustrates a vehicle 90 in accordance with one embodiment. The vehicle 90 may be a passenger vehicle (e.g., sedan, sports utility vehicle, etc.), a commercial shipping truck, or any other type of vehicle. An anti-distracted driver system 80 comprising an interrupt device 100 and a client device detector 150 is installed in vehicle 90 and coupled together via communication link 140 (which may be wired or wireless). The vehicle also includes a starter control 120, a solenoid 122 (also termed a "coil"), a starter motor 124, an engine 126 (e.g., an internal combustion engine), and a battery 128. To start the engine 126, the engine 126 may be cranked initially after the starter motor 124 is engaged. The starter control 120 provides a control signal to solenoid 122 which in turn electrically couples the starter motor 124 to the positive terminal of the battery 128.

In the example of FIG. 1, the interrupt device 100 includes a processor 102, a storage device 104, a cellular transceiver 106, a data interface 108, a global positioning system (GPS) receiver 110, an electrical signal driver 112, and a relay 114. The processor 102 couples to the storage device 104, the cellular transceiver 106, the data interface 108, the GPS receiver 110, and the electrical signal driver 112 by way of one or more busses. The electrical driver 112 can assert a signal to control the state of the relay 114 to either an engaged (i.e., open) state or a disengaged (i.e., closed) state. The relay 114 is connected between the starter control 120 and the solenoid 122. When engaged, the relay 114 can conduct current from the starter control 120 to the solenoid 122 to thereby activate the starter motor 124 to start engine 126. When disengaged, however, current cannot flow from the starter control 120 to the solenoid 122 and thus the engine 126 cannot be started despite an operator of the car activating the starter control 120 (e.g., turning a key in the ignition, pushing a start button, etc.).

The storage device 104 of the interrupt device is a non-transitory storage device such as volatile memory (e.g., random access memory (RAM)), non-volatile storage (e.g., solid state storage, magnetic storage, battery-backed RAM, etc.) or combinations thereof. The storage device 104 includes software 103 which comprises instructions which can be executed by processor 102 to provide the functionality described herein as attributed to the processor.

As such, the interrupt device 100 is able to prevent or permit the vehicle's engine to be started through control of the interrupt device's relay 114. The relay 114 may be part of the interrupt device 100 or may be a separate component electrically connected to the interrupt device 100. The interrupt device 100 may be installed at any location within the vehicle such as within or under the dashboard, in the engine compartment, or elsewhere in the vehicle.

In some embodiments, the interrupt device 100 may be used to prevent an electric vehicle from having its electric motor used to move the vehicle. In some implementations, the interrupt device may be disposed between the battery and the electric motor to thereby prevent current from reaching the electric motor.

FIG. 1 also shows a network 92 to which a server system 94 and an administrator device 96 can be coupled. The administrator device 96 may be any type of internet-connected device such as a computer or smart phone, and a user of the administrator device 96 may access one or more services on the server 94 through a web interface, a dedicated application (app) or other type of user interface.

The client device detector 150 may be located in the glove box 148 of the vehicle 90, or in any other location which is difficult to access by the operator while driving the vehicle (e.g., trunk area, back passenger area, etc.). The client device detector 150 in the example of FIG. 1 includes a data interface 152 and a detect circuit 154.

In operation, the interrupt device 100 prevents the engine 126 from being started unless a valid client device 160 is coupled to the client device detector 150. The client device 160 may be connected to the client device detector through a wired or wireless interface. In the example of FIG. 1, a wired interface is shown which connects a connector 162 on the client device 160 to a corresponding connector 156 of the client device detector 150. The wired interface may be implemented as a cradle into which the client device 160 can be inserted or an electrical cable to which the client device is connected. In embodiments in which the wired interface is implemented as a cradle, the cradle may rest in or be affixed to the inside of the vehicle's glove box. In embodiments in which the wired interface is an electrical cable, the electrical cable is provided in the glove box and is not long enough to extend out of the glove box. In embodiments in which a wireless interface is provided to couple the client device 160 to the client device detector 150, the wireless interface may be of short enough range (e.g., a few inches) that the client device 160 must be placed inside the glove box 148 to be detected wirelessly by the client device detector. An example of a suitable wireless interface includes Bluetooth Low Energy (BLE).

An administrator of an account is able to restrict who can start the vehicle 90. For example, the administrator may be a parent and may want to restrict operation of a particular family vehicle to one or more drivers in the family. The anti-distracted driver system 80 not only ensures that only an authorized driver is attempting to start the engine 126 and operate the vehicle, but does so by requiring that a predetermined client device 160 associated with each such authorized driver is detected by the client device detector 150, which means it has been placed in the glove box 148, and confirmed as being authenticate.

Figure 2:
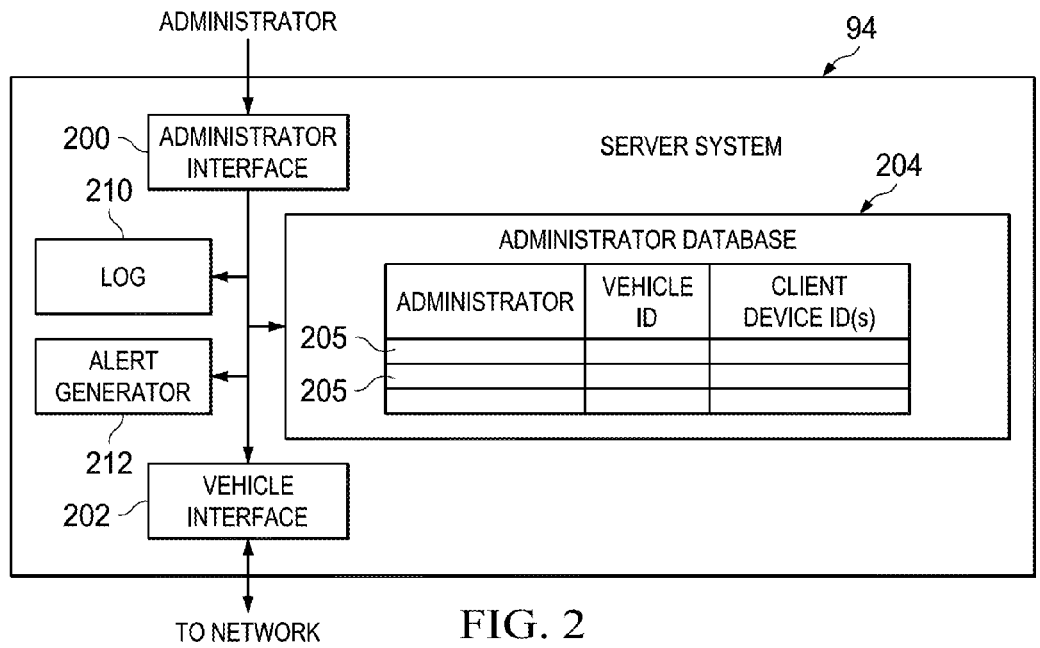
FIG. 2 shows a block diagram of a server system which permits administrators to access and manage their accounts and configure individual anti-distracted driver systems in accordance with at least some examples.

The account administrator uses the administrator device 96 to access the account. The management of the account is maintained by server system 94. Referring to FIGS. 1 and 2, the server system 94 implements an administrator interface 200, a vehicle interface 202, an administrator database 204, a log 210, and an alert generator 212. In some embodiments, the administrator interface 200 may be a web service which generates and transmits web pages across network 92 to a browser executing on the administrator device 96. In other embodiments in which the administrator device includes an application executing thereon, the administrator interface 200 may implemented as a server application that interacts with application running on the administrator device 96.

Through the administrator interface 200, a user of the administrator device 96 is able to log in to an account associated with a particular vehicle. A username and password (or other form of credential) may be required to verify the account access. The account itself may be associated with the vehicle 90 in some embodiments, or a vehicle identifier (e.g., the vehicle identification number (VIN), license plate number, etc.) may be provided via the administrator device 96.

Once the administrator has accessed the proper account, the administrator is able to add one or more vehicle client device identifiers (IDs) to the database 204 in association with the vehicle 90. A client device ID is a value that uniquely identifies a given client device 160. Examples of suitable client device IDs include serial number, the 10 digit phone number, International Mobile Equipment Identity (IMEI), Integrated Circuit Card Identifier (ICCID), Mobile Equipment Identifier (MEID), etc. Some or all of these values are accessible through a settings option on a smart phone. The detect circuit 150 also is able to access the client device to retrieve the various client device's IDs. The database 204 stores an entry 205 for each vehicle 90 that includes an anti-distracted driver system 80. Each such entry 205 includes an identity of the administrator (username, password, name, etc.), the vehicle ID (VIN, license plate number, etc.) and the client device ID(s) that the administrator desires to be associated with that particular vehicle. More than one client device ID can be associated with the vehicle 90 as desired by the administrator.

The server system's vehicle interface 202 may transmit configuration data to the storage device 104 of the interrupt device 100 as well as receive operational data from the interrupt device via the cellular transceiver 100 for storage in log 210 and generation of an alert by alert generator 212. Such operational data may include an indication that any one or more of the following events has occurred:

The vehicle's engine was started with a valid client device 160 having been detected by the client device detector 154;

After the engine was turned with a valid client device having been detected and while the vehicle's engine remains on, the client device was removed;

An attempt was made to start the engine without a valid client device 160 being detected (either no client device was detector or a client device was detected but it was not one having a client ID that matches one the administrator provided);

The override control 170 (described below) was activated; and

Location data from the interrupt device's GPS receiver.

In some embodiments, the ignition state of the vehicle is determined to decide, in part, when to send the alert. For example, if a valid client device was detected by the client device detector 154 and then removed without the person ever starting the engine, then no alert should be generated.

Through the vehicle interface 202 the server system 94 can transmit the client device ID (which may include more than one client device ID) specified by the administrator as being a valid client device ID for the specified vehicle to the cellular transceiver 106 of the interrupt device 100. The transmitted client device ID is received by the processor 102 from the cellular interface 106 and stored in storage device 104 as IDs 105.

Figure 3:
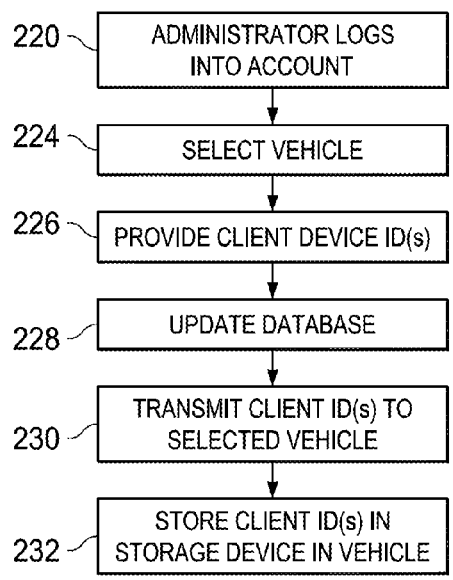
FIG. 3 shows a method by which an administrator can configure the anti-distracted driver system of given vehicle in accordance with various examples.

FIG. 3 illustrates a method of programming the anti-distracted driver system 80 by an administrator. The operations may be performed in the order shown or in a different order. Further, two or more of the operations may be performed concurrently rather than sequentially. Those operations performed by the administrator may be implemented by the administrator using an administrator device 96.

At 220, the method includes the administrator logging into his or her account. At 224, the administrator may select a particular vehicle to manage. In some embodiments, the administrator may be able to manage the anti-distracted driver systems 80 of multiple vehicles and thus selects (e.g., from a drop-down menu or other type of list) the vehicle of interest. At 226, the method may include the administrator providing a client device ID for the selected vehicle. In some cases, the administrator may provide more than one client device ID for a given vehicle. The administrator may type in the client device ID into a user interface on the administrator device 96 in some embodiments. In other embodiments, the client device itself that administrator wants to add to the database 204 can be coupled to the administrator device 96 (e.g., by a USB cable) and the administrator device 96 may directly extract one or more client device IDs from the client device and transmit the client IDs over network 92 to the administrator interface 200 of the server system 94. In yet another embodiment, a client device that has not been pre-authorized by the administrator to operate the vehicle nevertheless may be detected by the client device detector 150 (e.g., installed in a cradle). As the ID of that client device will not be found in the database 204, the vehicle's engine will be prevented from starting. Instead, however, a message may be sent to the server system 94 that an invalid client device has been detected. The server system 94 may respond by sending a message to the administrator device 96 that a client device has been detected that has not yet been authorized by the administrator. The message to the administrator device may include a name or phone number associated with the client device. The administrator then can elect to authorize, or not, the newly detected client device. If the administrator authorizes the client device, the ID from the client device can then be added to the database and the vehicle's engine will be permitted to be started.

The administrator database 204 is updated with the newly provided client device ID from the administrator device. The update may include adding a new entry 205 to the database 204 to specify the administrator, vehicle ID and the client device ID. In other cases, the entry 205 may already exist and the administrator simply wants to add a new client ID for a vehicle previously entered into the account by the administrator.

At 230, the method includes transmitting the client ID(s) to the selected vehicle. This transmission may be a cellular transmission to the cellular transceiver 106 of the interrupt device 100. The transmission may include all of the client device IDs (if more than one is present) from the entry 205 corresponding to the vehicle and such client device IDs may be used to overwrite any and all client device IDs 105 previously stored in storage device 104. In other cases in which the administrator has added a client device ID to the account, the transmission may include the new client device ID and not the previously transmitted client IDs which are presently stored in storage device 104. Finally, the transmitted client device ID is stored in storage device 104 in the interrupt device 100 in vehicle 90.

Referring again to FIG. 1, the relay 114 in some embodiments is disengaged by default. This means that the starter motor 124 cannot be activated and the engine 126 cannot be started. To start the engine, a client device 160 is coupled to the client device detector 150 (e.g., by inserting the client device into a cradle, connecting a cable to the client device's connector 162, or positioning the client device close enough to the detect circuit 154 (in the event of a wireless interface). The detect circuit 154 detects the presence of the client device 160. In some examples, the detect circuit 154 includes voltage comparator that examines the voltage level on one or more of the signal pins of connector 156. The corresponding signal pins of the client device's connector 162 may be a particular logic state or voltage level and thus the voltage comparator may detect a change in the voltage level of the signal pin upon insertion of the client device into the cradle or mating to a cable.

In some embodiments, the detect circuit 154 transmits a signal through the data interface 152 to the data interface 108 of the interrupt device 100, and thus through the data interface 108 to processor 102. The processor may transmit a signal back to the client device 160 through the client device detector 150 to provide one or more of the client device's IDs. The client device 160 provides its client IDs through the detector circuit 154 and data interface 152 to the data interface 108 of the interrupt device 100. The processor 102 then receives the client device IDs and compares them to the ID(s) 105 previously transmitted to the interrupt device 100 from the server system 94 and stored in storage device 104.

In the embodiments in which the relay 114 is disengaged by default, if no match is determined by the processor 102 between the client device IDs provided by the client device 160 and the valid client device ID(s) in storage 105, then no further action is needed to prevent the vehicle's engine 126 from being started. If, however, a match between the client device IDs provided by the client device 160 and the valid client device ID(s) in storage 105 is determined to exist by the processor 102, then the processor asserts a signal to the driver 112 to thereby engage the relay 114. Engagement of the relay electrically connects the starter control 120 to the solenoid 122 of the starter motor 124. As a result of activating the starter control 120, the operator of the vehicle 90 can cause the engine 126 to start.

Figure 4:
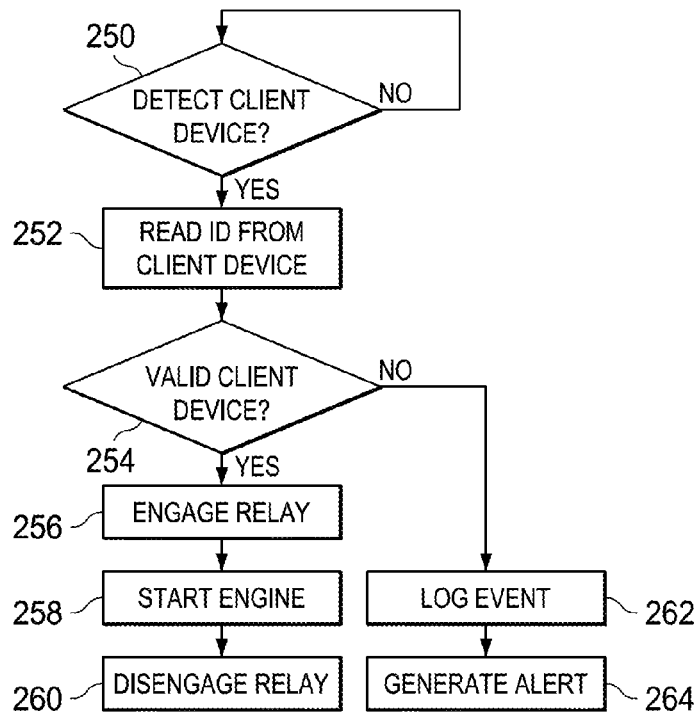
FIG. 4 shows a method by which the anti-distracted driver system can prevent a vehicle's engine from being started in accordance with various examples.

FIG. 4 illustrates a method as explained above in which the interrupt device's relay 114 is disengaged by default thereby preventing the engine from being started unless affirmatively engaged by the interrupt device, which may only occur if a valid client device 160 is detected by the anti-distracted driver system 80. The operations may be performed in the order shown or in a different order. Further, two or more of the operations may be performed concurrently rather than sequentially. At 250, the client device detector determines whether a client device 160 is present as coupled (wirelessly or wired) to the detect circuit 154. Once the client device detector 150 detects the presence of a client device 160, the client device ID is read (252) from the newly detected client device. In some embodiments, one client device ID is read from the client device, while in other embodiments, multiple client device IDs (if more than one client device ID exists) are read from the client device ID. In some embodiments, the processor 102 of the interrupt device 100 may send a command through data interfaces 108 and 148 to the client device 160 to return its client device ID to processor 102. The client device 150 forwards the command to the client device 160 and returns the reply back to the interrupt device.

The client device ID(s) from the detected client device is (are) compared at 254 to the one or more IDs 105 stored in storage device 104. This comparison may be performed by processor 102. If only client device ID is obtained from the client device 160, then that one client device ID is compared to the IDs 105 previously stored in storage device 104 to determine if the client device ID obtained from the client device is the same as any of the IDs in storage 104. If multiple client device IDs are read from the client device 160 (e.g., serial number, IMEI, ICCID, MEID, etc.) then each such client device ID may be compared to the set of IDs 105 stored in storage device 104 to determine if any of them match.

If a match is found (indicative of the client device 160 detected by the client device detector 150 being a client device that has been pre-designated as valid by the administrator for starting the vehicle), then at 256, the method includes engaging the relay 114 in the interrupt device 100. This operation may be performed by the processor 102 asserting a signal to driver 112 to cause the relay's contacts to close thereby permitting a signal to flow from the starter control 120 to the solenoid 122 of the starter motor 124. The engine can then be started at 258 by, for example, a person activating the starter control 120 (e.g., turning a key in the ignition switch, pushing a start button, etc.).

At 260, the relay 114 in the interrupt device 100 disengages thereby resetting for the next time someone attempts to start the engine 126. The processor asserts a signal to the driver 112 to thereby cause the contacts of the relay 114 to open to prevent a signal from the starter control 120 from reaching the solenoid 122. In some embodiments, the processor 102 may cause the relay 114 to be disengaged a predetermined time period after causing the relay to be engaged in the first place at 256. The predetermined time period may be any suitable time period at least long enough to allow the operator of the vehicle to shut the glove box 148 and turn on the engine. The predetermined time period may be 30 seconds, 1 minute, 5 minutes, etc.

In other embodiments, the relay 114 remains engaged as long as the engine 126 is on, and then is automatically disengaged upon the engine turning off. In some examples, the relay 114 may be disengaged upon expiration of a predetermined period of time after the engine is turned off (e.g., 30 seconds, 1 minute, 5 minutes, etc.) as a safety precaution in case the engine turns off while the vehicle is in an unsafe location such as on a railroad track.

If the processor 102 determines that the client device is not valid at 254, the engine will not be able to be turned on because the interrupt device's relay 114 is disengaged by default. At 262, the processor 102 enters a log event in log 107 in storage device 104. The logged event indicates that a client device 160 was detected by the client device detector 150, but the client device did not match any of the previously stored IDs authorized as valid by the administrator. The processor 102 also may cause an alert to be generated at 264 and transmitted to the server system 94 and/or administrator device 96 through the network 92. The alert generated by processor 102 may include an email, text message, audio recording, etc.

Referring briefly to FIG. 2, the vehicle interface 22 of the server system 94 may receive the alert from the anti-distracted driver system 80 and store the alert, or information indicative of the alert in log 210. Further, the alert generator 212 may generate and transmit an alert to, for example, the administrator. Thus, either or both of the interrupt device 100 and the sever system 94 may generate and transmit an alert to the administrator.

Figure 5:
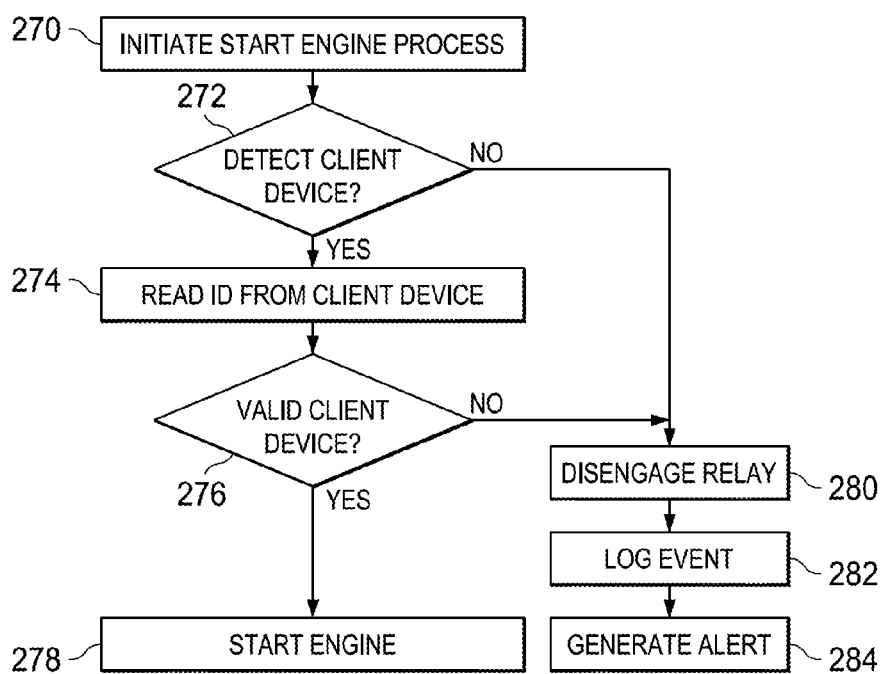
FIG. 5 shows another method by which the anti-distracted driver system can prevent a vehicle's engine from being started in accordance with another example.

FIG. 5 illustrates an example of a method in which the interrupt device's relay 114 is engaged by default. The operations may be performed in the order shown or in a different order. Further, two or more of the operations may be performed concurrently rather than sequentially. At 270, a process to start the engine 126 has been initiated. This operation may involve a person turning the key in the ignition or pushing a start button, but the engine has not yet started. During the period of time that it would take to turn on the engine, the rest of the operations of FIG. 5 may be performed. Operational flow then passes to operation 272 is then performed as a result of detecting the engine start process.

At 272, the client device detector 150 determines whether a client device 160 is present as coupled (wirelessly or wired) to the detect circuit 154. Once the client device detector 150 detects the presence of a client device 160, the client device ID is read (274) from the newly detected client device. As noted above, one client device ID is read from the client device, while in other embodiments, multiple client device IDs (if more than one client device ID exists) are read from the client device ID.

The client device ID(s) from the detected client device is (are) compared by processor 102 at 254 to the one or more IDs 105 stored in storage device 104. If only client device ID is obtained from the client device 160, then that one client device ID is compared to the IDs 105 previously stored in storage device 104 to determine if the client device ID obtained from the client device is the same as any of the IDs in storage 104. If multiple client device IDs are read from the client device 160, then each such client device ID may be compared to the set of IDs 105 stored in storage device 104 to determine if any of them match.

If a match is found at 276 (indicative of the client device 160 detected by the client device detector 150 being a client device that has been pre-designated as valid by the administrator for starting the vehicle), then at 256, the method includes completing at 278 the process of starting the engine. This operation may include current flowing to the solenoid 122 to thereby engage the starter motor which in turn causes the engine 126 to turn.

If, however, the client device is determined not be valid at 276, then at 280 the method includes disengaging the relay 114. The processor 102 may assert a signal to the driver 112 to thereby cause the contacts of relay 114 to open effectively disconnecting the starter control 120 from the solenoid 122. This operation occurs after the person begins to turn the key or otherwise activate the starter control 120 but before the engine 126 would otherwise have turned on during a normal start.

At 282, an event is entered in log 107 that someone attempted to start the vehicle without the presence of a valid client device 160 and an alert may be generated at 284. The alert may be provided directly to the administrator and/or to the administrator through the server system 94 using, for example, the server system's alert generator 212. The event also may be stored in log 210 in the server system.

If someone attempts to start the engine in the embodiment in which the relay is engaged by default, but no client device at all is detected by the client device detector 150, then from 272 control flows to operations 280-284 in which the interrupt device's relay is disengaged (preventing the engine from being turned on), the event is logged and an alert is generated.

Figure 6:
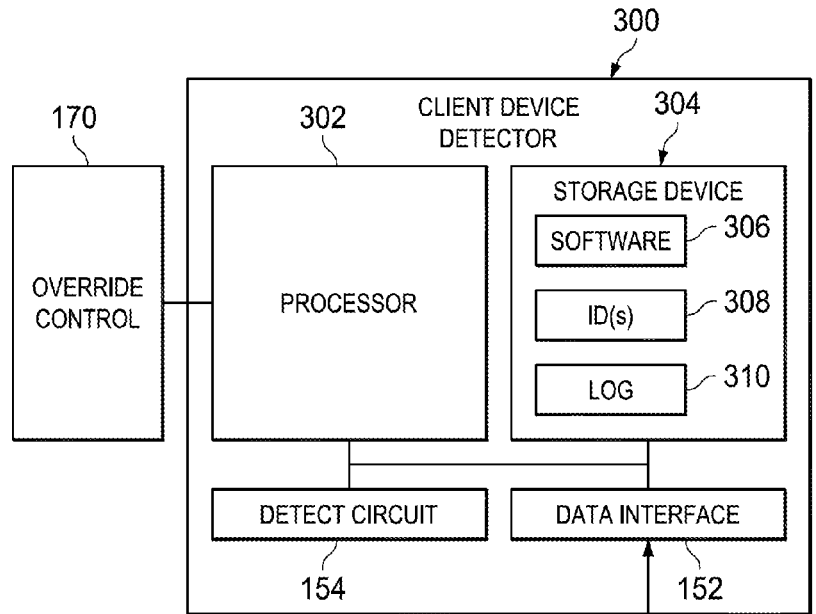
FIG. 6 shows a block diagram of the client device detector in accordance with another embodiment from that illustrated in FIG. 1.

In some embodiments, the client device 150 detects that a client device 160 is present but the interrupt device 100 is responsible for reading the ID from the client and determining whether the client device is valid. In other embodiments, the client device detector is configured to detect the presence of the client device and determine whether it is valid. FIG. 6, for example, shows an embodiment of a client device detector 300 which includes a processor 302, a storage device 304, the data interface 152, and the detect circuit 154. The construction of and functions performed by the data interface 152 and the detect circuit 154 are the same or similar as that described above. The processor 302 is configured to execute software 306 stored in the storage device 304. The storage device 304 is, or includes, non-transitory storage such as volatile memory (e.g., RAM), non-volatile storage (e.g., solid state storage, magnetic storage, battery-backed RAM, etc.) or combinations thereof. The software 306 in the storage device 304 comprises instructions which can be executed by processor 302 to provide the functionality described herein as attributed to this embodiment of the client device detector.

The IDs submitted by the administrator through the administrator interface 200 to the server system 94 can be downloaded wirelessly to the cellular interface 106 of the interrupt device 100, and then transmitted through the data interfaces 108 and 152 to the processor 302 for storage as IDs 308 in the storage device 304. In this embodiment, the client device detector 300 can detect the presence of a client device as described previously, and then perform the client device authentication as explained above as being performed by the processor 102 of the interrupt device 100. That is, reading the client device IDs from the client device 160 and comparison to the IDs 308 previously provided by the administrator can be performed by the client device detector 300. In this embodiment, the client device detector 300 provides, for example, a go/no-go signal to the interrupt device 100 to indicate whether or not a valid client device has been detected. A "go" signal indicates that a client device has been detected and that the client device has an ID that matches one of the IDs provided by the administrator. A "no-go" signal indicates that either no client device has been detected, or that a client device has been detected but its ID did not match any of the IDs provided by the administrator. The go/no-go signal may be a single bit (e.g., 0 is no-go and 1 is go), separate signals, or multi-bit message.

The storage device 304 also may include a log 310 in to which any of the log events described herein can be stored by processor 302. For example, the processor may store information in log 310 indicative of attempts to start the vehicle engine without a client device containing the valid client ID being detected by the detect circuit 154 and authenticated by the processor 302. By way of another example, the processor 302 may store information in the log 310 indicative of an event by which, post-engine starting, the client device detector no longer detects a client device. The contents of log 310 can be provided to the interrupt device 100 and transmitted through the cellular interface 106 to the server system 94, and thus to the administrator device 96.

The interrupt device 100 in this embodiment may not have the IDs 105 stored in storage device 104, but still causes the relay to engage or disengage based on the go/no-go signal from the client device detector 300.

Referring again to FIG. 1, the override control 170 may comprise a user control which permits a person to override the anti-distracted driver system 80 from preventing the engine from being started. That is, up on successful activation of the override control 170, the engine can be started without regard to whether a client device 160 is detected by the client device detector 150, 300 or whether the client device ID from a detected client device matches a valid client device ID stored in the storage device of the client device detector or the interrupt device. Overriding the prohibition by the anti-distracted driver system 80 from permitting the engine to start may be useful in a variety of situations such as to have the vehicle parked by a valet driver, to have the vehicle maintained at a service facility, loaning the vehicle to another person, etc.

In some implementations, the override control 170 includes a keypad which may be mounted on the inside or outside of the vehicle. For example, the override control 170 may be placed near the client device detector 150, 300. To successfully activate the override control 170, a person must enter a valid override code into the keypad. In other embodiments, the override control 170 may comprise a key lock, a biometric sensor (e.g., fingerprint, retinal scan, etc.) or any other type of user control. The override control 170 may be coupled to processor 102 of the interrupt device 100 as shown in the example of FIG. 1 or to processor 302 of the client device detector 300 as shown in the example of FIG. 6.

Once the override control 170 is successfully activated, the processor 102 may temporarily engage relay 114 to permit the engine to be started at will. The relay 114 may be engaged for a predetermined period of time such as 1 hour, 2 hours, a day, etc. In other embodiments, the relay 114 may be engaged until the override control 170 is again successfully activated. A visual indicator may be provided on or near the override control 170 to provide a visual feedback that the override state has been activated.

Figure 7:
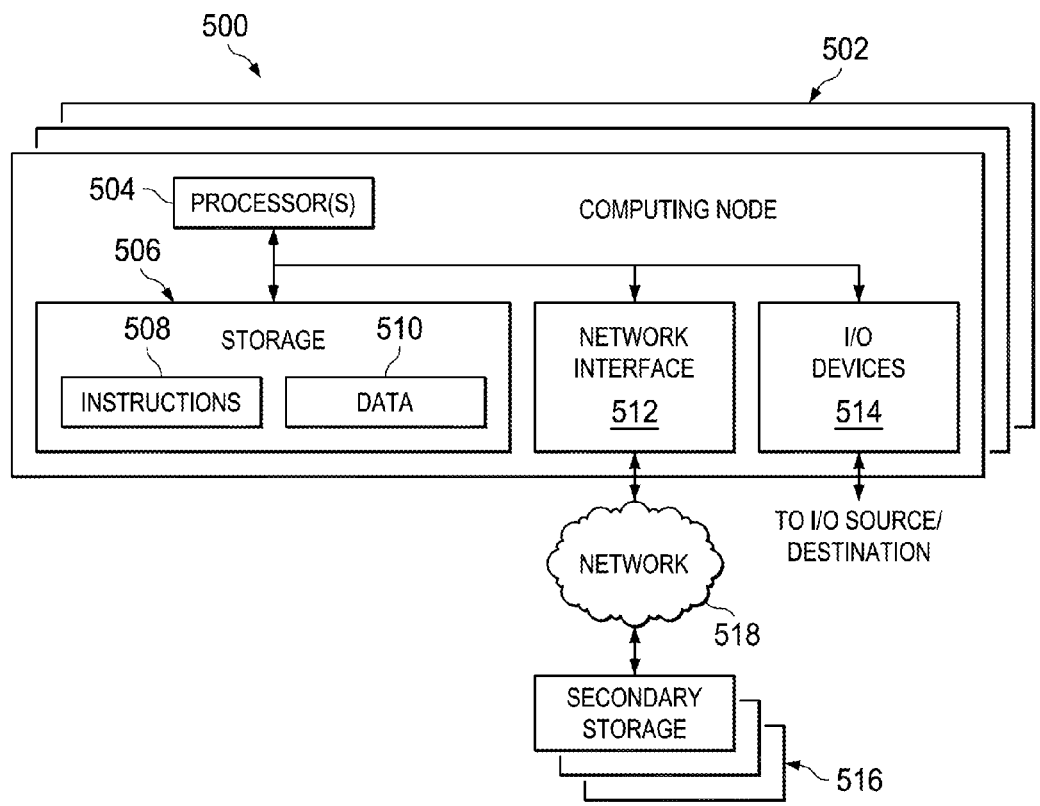
FIG. 7 shows a block diagram of a computing system in accordance with various embodiments.

FIG. 7 shows a schematic diagram for a computing system 500 suitable for implementation of the server system 94 in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the administrator interface 200, the vehicle interface 202, the administrator database 204, the log 210 and the alert generator 212.

Each computing device 502 includes one or more processors 504 coupled to memory 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the administrator interface 200, the vehicle interface 202, the administrator database 204, the log 210 and the alert generator 212, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.), Program instructions 508 and data 510 implementing the functionality disclosed herein are stored within storage 506. For example, instructions 508 may include instructions that when executed by processor(s) 504 implement the administrator interface 200, the vehicle interface 202, the administrator database 204, the log 210 and the alert generator 212.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CIS/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the administrator interface 200, the vehicle interface 202, the administrator database 204, the log 210 and the alert generator 212 described herein may be implemented as a separate computing device 502 executing software to provide the computing node with the functionality described herein. In some embodiments, the administrator interface 200, the vehicle interface 202, the administrator database 204, the log 210 and the alert generator 212 may be implemented by the same computing node.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, Internet appliances, PDAs, wireless phones, pagers, etc. Computing device 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
an interrupt device including a processor, a relay and a storage device, wherein the relay is for connection between a starter control and a starter solenoid for a starter motor of a vehicle, wherein the processor is configured to control the relay to interrupt or allow current to the solenoid, and wherein the storage device is configured to store a valid mobile communication device identifier (ID); and
a mobile communication device detector mountable in an closeable enclosure within the vehicle and including a detect circuit configured to detect electrical communication to a mobile communication device, to read a mobile communication device ID from the mobile communication device, and to transmit the mobile communication device ID to the interrupt device;
wherein the processor of the interrupt device is configured to compare the mobile communication device ID received from the mobile communication device detector to the valid mobile communication device ID; and
wherein, when the mobile communication device ID received from the mobile communication device detector matches the valid mobile communication device ID, the processor of the interrupt device is configured to assert a first signal to the relay to cause the relay to change state to allow current to flow to the solenoid to thereby cause the starter motor to start an engine.

2. The system of claim 1, wherein the mobile communication device detector includes a wireless interface over which the mobile communication device is to be detected.

3. The system of claim 2, wherein the wireless interface is a Bluetooth wireless interface.

4. The system of claim 1, wherein the mobile communication device detectable by the communication device detector is comprises a smart phone.

5. The system of claim 1, further comprising a cellular transceiver, and wherein the processor is configured to transmit a message through the cellular transceiver to a server, the message including an identifier of the mobile communication device.

6. The system of claim 1, further comprising a cellular transceiver.

7. A vehicle, comprising:
an interrupt device including a processor, a relay and a storage device, wherein the relay is connected between a starter control and a starter solenoid for a starter motor, wherein the processor is configured to control the relay to interrupt or allow current to the solenoid, and wherein the storage device is configured to store a valid mobile communication device identifier (ID);
a closeable enclosure: and
a mobile communication device detector mounted in the closeable enclosure within the vehicle and including a detect circuit configured to detect electrical communication to a mobile communication device, to read a mobile communication device ID from the mobile communication device, and to transmit the mobile communication device ID to the interrupt device;
wherein the processor of the interrupt device is configured to compare the mobile communication device ID received from the mobile communication device detector to the valid mobile communication device ID; and
wherein, when the mobile communication device ID received from the mobile communication device detector matches the valid mobile communication device ID, the processor of the interrupt device is configured to assert a first signal to the relay to cause the relay to change state to allow current to flow to the solenoid to thereby cause the starter motor to start an engine.

8. The vehicle of claim 7, wherein the closeable enclosure is a glovebox.

9. The vehicle of claim 7, wherein, when the mobile communication device ID received from the mobile communication device detector does not match the valid client device ID, the interrupt device is configured to add an item to a log, the item indicative of detection of the presence of an invalid mobile communication device.

10. The vehicle of claim 7, wherein current does not flow to the solenoid unless a key is turned in an ignition switch of the vehicle and the processor of the interrupt device asserts the first signal to the relay.

* * * * *